(12) United States Patent
Charters et al.

(10) Patent No.: US 10,001,984 B2
(45) Date of Patent: Jun. 19, 2018

(54) IDENTIFICATION OF SOFTWARE UPDATES USING SOURCE CODE EXECUTION PATHS

(71) Applicant: INTERNATIONAL BUSINESS MACHINES CORPORATION, Armonk, NY (US)

(72) Inventors: Graham C. Charters, Southhampton (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/238,944

(22) Filed: Aug. 17, 2016

(65) Prior Publication Data

US 2018/0052676 A1 Feb. 22, 2018

(51) Int. Cl.
*G06F 9/44* (2018.01)
*G06F 9/445* (2018.01)
*G06F 17/30* (2006.01)

(52) U.S. Cl.
CPC .......... *G06F 8/65* (2013.01); *G06F 17/30368* (2013.01); *G06F 17/30554* (2013.01)

(58) Field of Classification Search
CPC . G06F 8/65; G06F 17/30554; G06F 17/30368
USPC ....................................................... 717/168
See application file for complete search history.

(56) References Cited

U.S. PATENT DOCUMENTS

| 8,296,605 | B2* | 10/2012 | John | G06F 11/0748 |
| | | | | 714/25 |
| 8,327,190 | B2* | 12/2012 | Shinboku | G06F 11/0775 |
| | | | | 714/26 |
| 8,443,357 | B2* | 5/2013 | Nguyen | G06F 8/68 |
| | | | | 717/169 |
| 2007/0050678 | A1* | 3/2007 | Estes | G06F 11/0748 |
| | | | | 714/38.1 |

* cited by examiner

*Primary Examiner* — Anna Deng
(74) *Attorney, Agent, or Firm* — L. Jeffrey Kelly

(57) ABSTRACT

Embodiments of the present invention disclose a method, computer program product, and system for identifying software updates where a stack trace is received, the stack trace including a first set of metadata. An execution failure is determined to have occurred in the received stack trace, and in response, one or more software updates are received, the one or more software updates including a second set of metadata. One or more matching metadata in the first and second set of metadata is determined. A subset of software updates for display is generated, the subset of software updates being associated with matched metadata, and in response to receiving a selection input from a user, one or more software updates of the generated subset of software updates are executed.

20 Claims, 3 Drawing Sheets

IDENTIFICATION OF SOFTWARE UPDATES USING SOURCE CODE EXECUTION PATHS

BACKGROUND

The present invention relates generally to the field of software updates, and more particularly to the utilization of stack trace monitoring to distribute relevant software updates.

When a software failure occurs, a system administrator may need to determine whether a relevant software update has been created as a fix. Applying all available updates as in sensitive/production environments may not be advantageous, as unnecessary changes may need to be avoided in order to prevent the introduction of new defects. Applying only relevant updates may minimize the risk of the introduction of new software bugs, yet fix the imminent defect.

SUMMARY

Embodiments of the present invention disclose a method, computer program product, and system for identifying software updates where a stack trace is received, the stack trace including a first set of metadata. An execution failure is determined to have occurred in the received stack trace, and in response, one or more software updates are received, the one or more software updates including a second set of metadata. One or more matching metadata in the first and second set of metadata is determined. A subset of software updates for display is generated, the subset of software updates being associated with matched metadata, and in response to receiving a selection input from a user, one or more software updates of the generated subset of software updates are executed.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Software fixes are commonly applied to software with failures via code changes or software updates. However, some updates may be unnecessary and can introduce new defects to the software. In various embodiments of the present invention, software failures are prevented by determining and recommending relevant updates based on the failing execution path and an analysis of the fix source.

Figure 1:
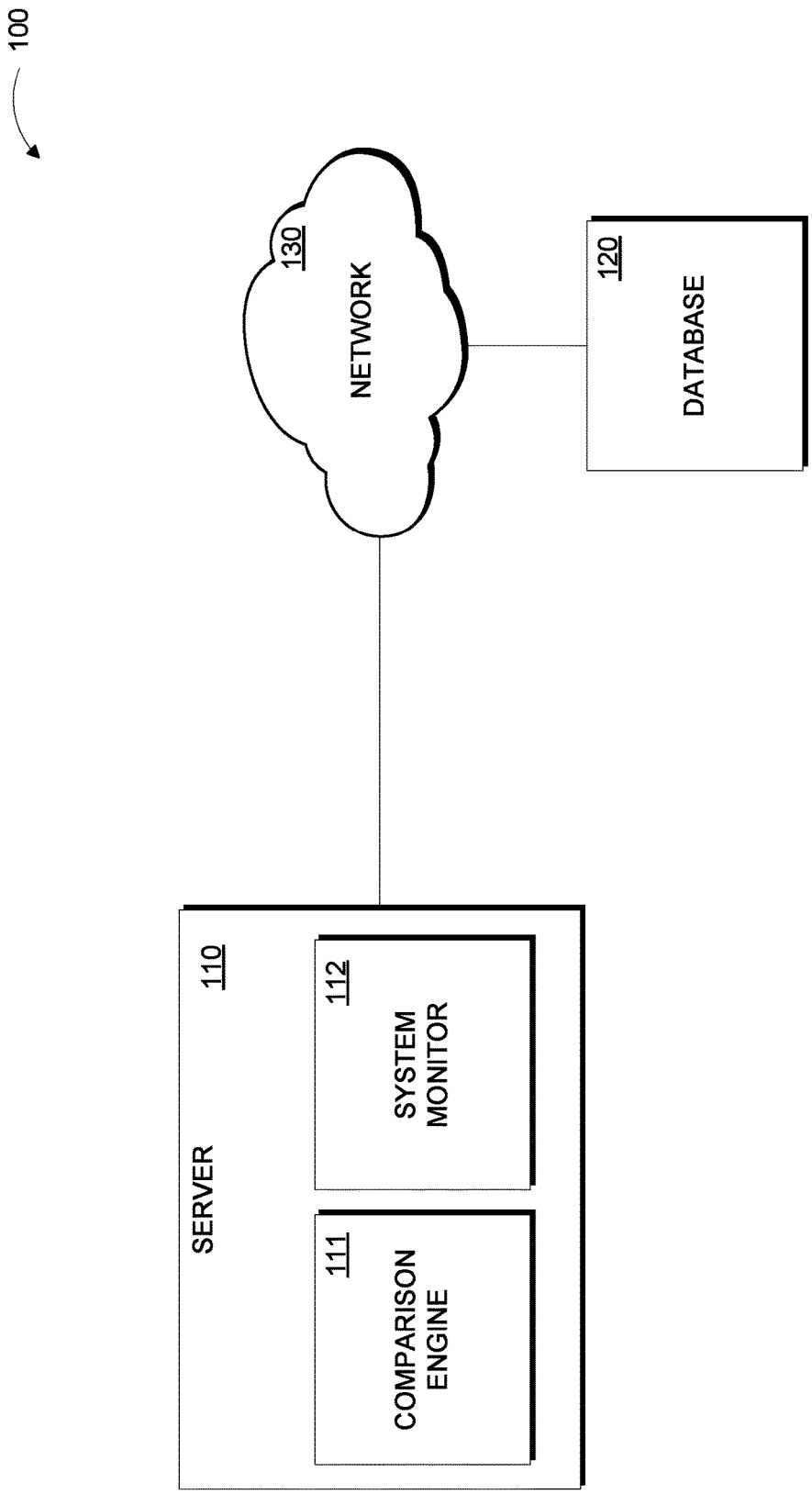
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 110 and database 120, all interconnected over network 130.

Server 110 and database 120 may be a laptop computer, tablet computer, netbook computer, personal computer (PC), a desktop computer, a smart phone, or any programmable electronic device capable of communicating via network.

Network 130 can be, for example, a local area network (LAN), a wide area network (WAN) such as the Internet, or a combination of the two, and can include wired, wireless, or fiber optic connections. In general, network 110 can be any combination of connections and protocols that will support communications between server computer 102 and client devices 104, 106, and 108.

Database 120 may be a standard database or Source Code Management system to record and maintain a mapping between individual software updates and their associated source code changes, or "diffs". By using a Source Code Management system, it may allow the additional capability of static analysis of execution paths through software, as all of the source code may be available. Relevant metadata can be generated in a number of ways; in various embodiments, metadata would be generated during the build phase of software development. Metadata may include a set of location data and/or a change log associated with individual software updates. For example in IBM Rational Team Concert (RTC) it may be possible to navigate the commands buildid, changesets, and source file diffs. A specific fix would be released based on a specific build identification (ID) and the database may generate a plurality of relationships between fixes and source file diffs. IBM Rational Team Concert is a trademark of International Business Machines Corporation in the United States and/or other countries.

Server 110 may act generally to detect software failures, query a database, for example, database 120, receive software updates, compare metadata associated with software updates with the software execution path failure to determine a match in metadata, record the path of the execution of the software at the point of failure, and based on an analysis of the paths and matched metadata, communicate relevant updates to a user. Server 110 includes comparison engine 111 and system monitor 112. Server 110 may include internal and external hardware components, as depicted and described in further detail with respect to FIG. 3.

Comparison engine 111 may act generally to execute a search to find a match between the point of failure recorded or received by the System Monitor 112, described in further detail below, and a software update entry in database 120. In an embodiment of the present invention, a search for changes anywhere along the stack trace and associate the changes to a potential update or fix. In various embodiments, algorithms may be used for static analysis in in conjunction with configuration files to do more extensive and exhaustive searches based on path of execution.

System monitor 112 may act generally to collect and upload execution data from a software at the time of failure. The point of failure could be recorded as the stack trace or path of execution through the software program. For example, in the Java programming language, the Java Runtime Environment performs this process automatically, writing the stack trace to the standard error reporting channels. In various embodiments, sampling of "Stack Frames" may be enabled, which may be used to record more historical information for more detailed analysis. An example of a Java stack trace can be seen in table 1 below:

TABLE 1

Java Stack Trace

Exception in thread "main" java.lang.NullPointerException
  at com.example.Class2.method2(Class2.java:50)
  at com.example.Class2.method1(Class2.java:25)
  at com.example.Class1.method1(Class1.java:10)
End For other languages where this stack trace is not provided, system monitor 112 may monitor the execution environment to collect a dump file or debugging information, which may allow the stack trace to be discovered after the failure. Once this information has been analyzed by comparison engine 111, system monitor 112 may generate a list of potential updates for display to a user, allowing them to be installed.

Figure 2:
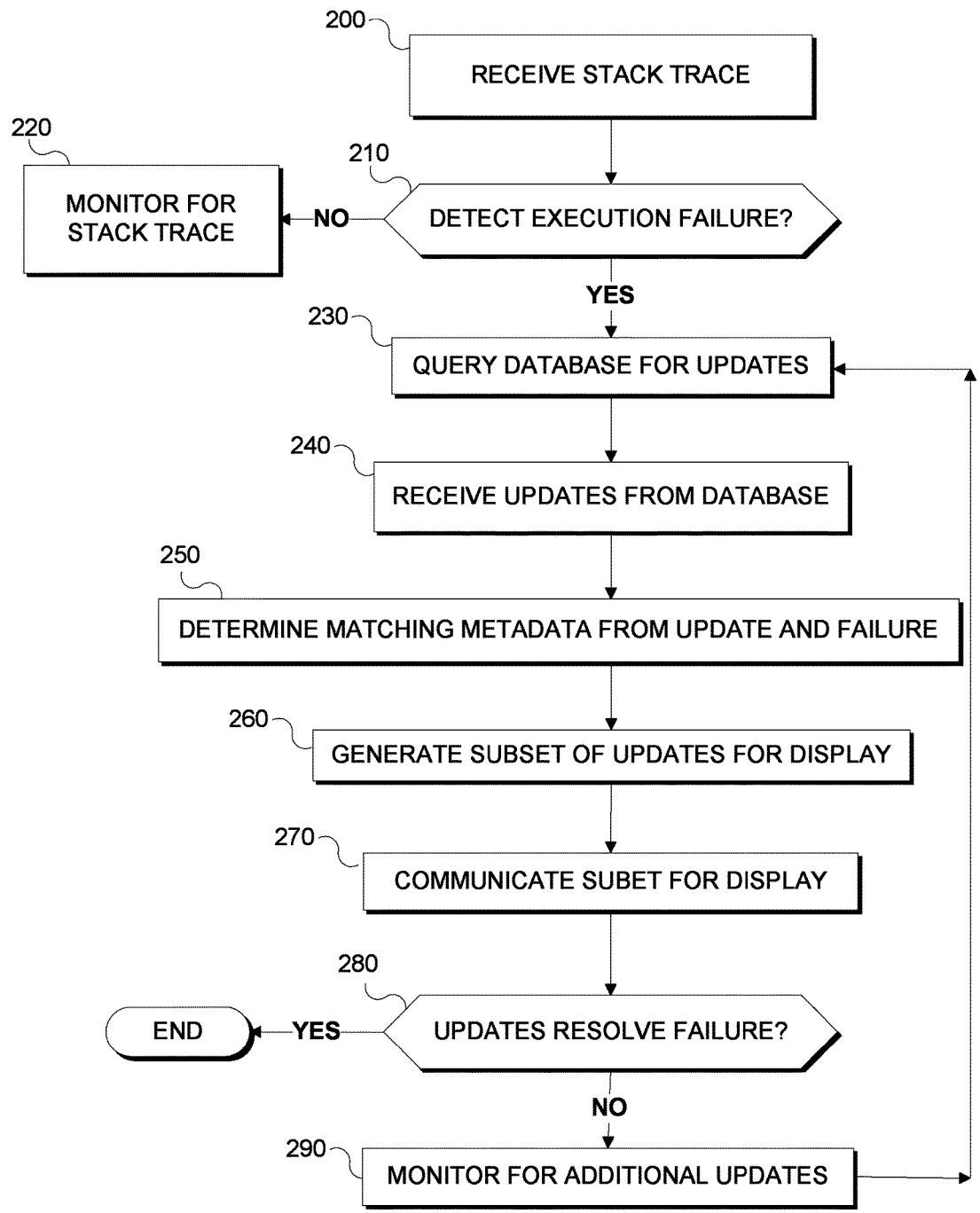
FIG. 2 is a flowchart depicting operational steps of an exemplary server computer within the distributed data processing environment of FIG. 1, in accordance with an embodiment of the present invention.

FIG. 2 is a flowchart depicting operational steps of an exemplary server computer within the distributed data processing environment of FIG. 1, in accordance with an embodiment of the present invention. Referring to FIGS. 1 and 2, in step 200, system monitor 112 receives a stack trace via server 110. In various embodiments, the stack trace may be a recorded point of failure or path of execution through a software program. For example, in the Java programming language, the Java Runtime Environment performs this process automatically, writing the stack trace to the standard error reporting channels. In various embodiments, historical information may be recorded for more detailed analysis. For other programming languages where a stack trace is not provided, system monitor 112 could query a software execution environment to collect a dump file or debugging information, which would allow the stack trace to be discovered after a failure, has occurred.

An execution failure is determined, or detected within, for example, a stack trace received by system monitor 112. If a failure is not detected, as in decision step 210 "NO" branch, system monitor 112 may monitor for another stack trace or queries the execution environment as described above, in step 220. If system monitor 112 detects a failure, decision step 210 "YES" branch, system monitor 112 communicates the stack trace to comparison engine 111. In various embodiments of the present invention, system monitor 112 may receive dump files and may generate a second stack trace in order to determine a software failure, in step 210.

Comparison engine 111 receives a plurality of software updates, for example, via a query of database 120, in step 230, and receives software updates and associated metadata, in step 240, for example, from database 120. The query may include any search algorithm know in the art in order to determine a set of matching data, or metadata associated with the software updates, and the point of failure determined above, in step 250.

Comparison engine 111 generates a subset of software updates for display, in step 260. The subset generated by comparison engine 111 contains software updates determined to match the failure as described in step 250. In various embodiments, the subset may be communicated to a user device for display or stored in a data store in memory, for example, computer readable storage media 308 described in FIG. 3 below.

Comparison engine 111 communicates the generated subset of software updates to system monitor 112 for display, in step 270. System monitor 112 determines if the software updates in the generated subset of software updates resolve the detected failure, in step 280. For example, system monitor 112 may receive a selection input from a user via server 110 selecting one or more software updates to install. If the selected software updates do not resolve the detected failure, in decision step 280 no branch, system monitor 112 periodically monitor or query database 120 for more recent updates than previously received. Various methods to determine updates that are more recent may be used, for example, comparisons of time stamps within software update metadata.

In various embodiments of the present invention, system monitor 112 may receive a stack trace from database 120, for example the stack trace as describe in Table 1 above, where system monitor 112 detects the failure and communicates the stack trace to comparison engine 112. System monitor 112 may communicate the stack trace using various methods, for example, via an HTTP POST command including, for example, the stack trace, a product or software ID number and a product or software version number.

Comparison engine 111 may determine a subset of software updates that may resolve the failure. In various embodiments comparison engine 111 may parse the stack trace received from system monitor 112. Comparison engine 111 may invoke a call, to the software with the failure, to determine build information, for example, based on the software version number, revision control number, or release number. The call may result in comparison engine 111 determining the build information of the software associated with the parsed stack trace. Comparison engine 111 may also invoke a call to the software to receive a plurality of change logs or a set of historical changes (software updates), for each file in the software from the point of failure. Comparison engine 111 may filter the set of historical changes received from the call, by generating a subset of the received historical changes, for example, by date or time stamp, and compare the date or time stamp of the software release, for example, a historical change made after the latest date of release may indicate a fix update. Various time filters may be used, for example, a date range including a start time stamp and ending time stamp.

The historical change sets filtered by comparison engine 111 may be parsed using a diff utility to determine a historical change matching the stack trace. For example, to determine a historical change in the stack trace in Java may be represented in Table 2:

TABLE 2

Java Stack Trace Change

--- com/examples/Class2.java
+++ com/examples/Class2.java
@@ -49,3 +49,3 @ @
        private void method2(String input) {
-               input.append("\n");
+               if (input != null) input.append("\n");
        }

Any matching historical change, or software update, may be filtered or ordered by comparison engine 111 in order to communicate for display the software updates that would most likely resolve the failure. Comparison engine 111 may calculate a priority value associated with the parsed software updates. The matching software updates may be ordered by the calculated and associated priority value where the associated value may be based on, for example, position in stack trace, line number in the software, modification date, and/or other metadata. Comparison engine 111 may communicate software updates, with an associated value above a threshold, to system monitor 112 for display to a user, in order to execute the software update.

Figure 3:
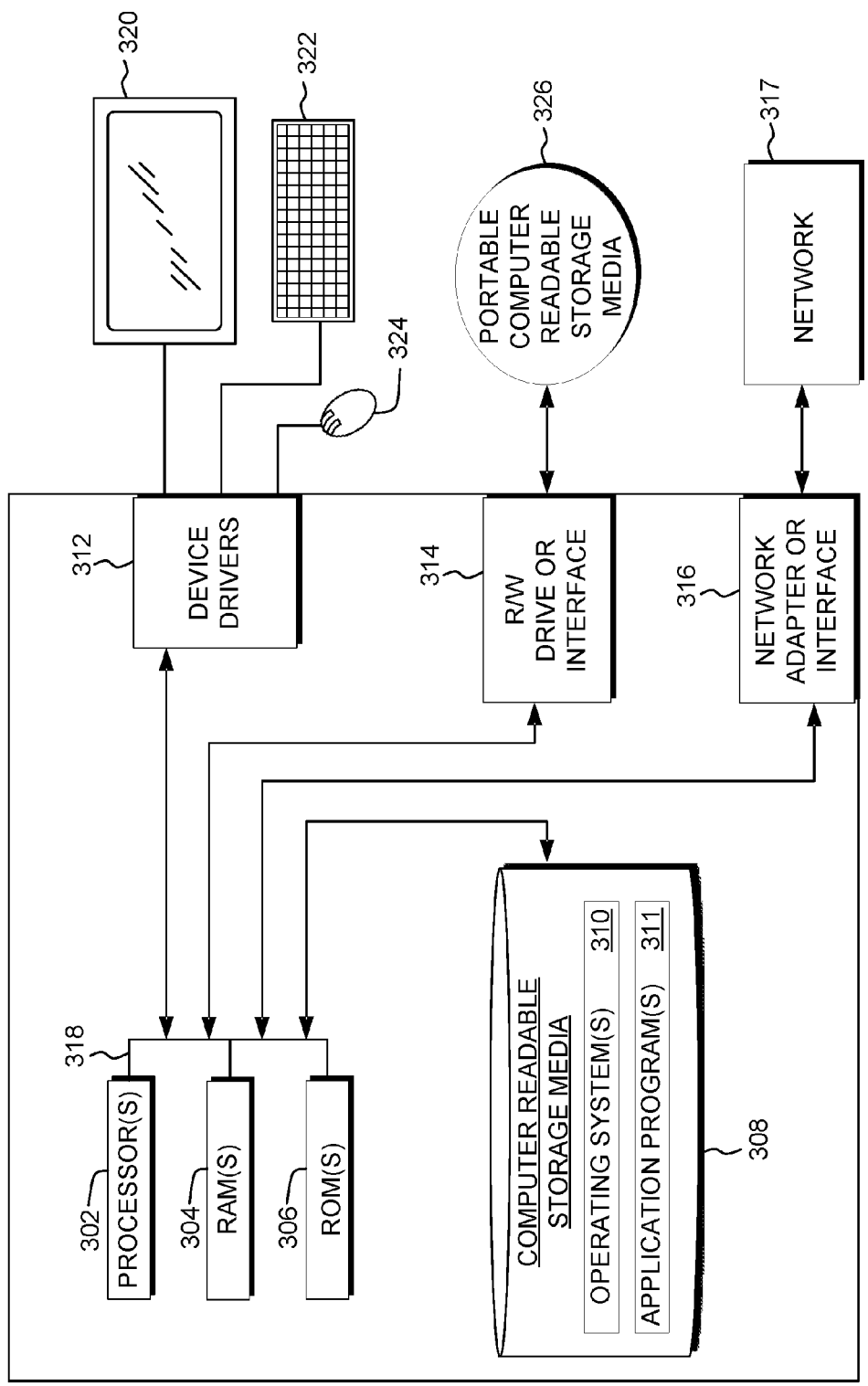
FIG. 3 depicts a block diagram of components of an exemplary computing device, in accordance with an embodiment of the present invention.

FIG. 3 depicts a block diagram of components of server 110 of distributed data environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Server 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, comparison engine 111 or system monitor 112, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 314 to read from and write to one or more portable computer readable storage media 326. Application programs 311 on server 110 may be stored on one or more of the portable computer readable storage media 326, read via the respective R/W drive or interface 314 and loaded into the respective computer readable storage media 308.

Server 110 may also include a network adapter or interface 316, such as a TCP/IP adapter card or wireless communication adapter (such as a 4G wireless communication adapter using OFDMA technology) for connection to a network 317. Application programs 311 on server 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Server 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for identifying software updates, the method comprising:
   receiving, by a processor, a stack trace, the stack trace including a first set of metadata; determining an execution failure in the received stack trace;
   receiving, by the processor, a plurality of software updates, the plurality of software updates including a second set of metadata associated with the execution failure;
   determining, by the processor, a subset of matching metadata, the subset of matching metadata including metadata from at least one of the first set of metadata and the second set of metadata, wherein determining the subset of matching metadata comprising:
      receiving a plurality of change logs associated with the plurality of software updates;
      generating a subset of the received plurality of change logs, the subset of change logs including change logs within a predetermined range, wherein the range includes at least a starting time stamp and an ending time stamp;
      parsing at least one of the change logs in the subset of change logs; and
      calculating a priority value associated with at least one of the change logs of the subset of parsed change logs,
      wherein the subset of matching metadata further comprises the at least one of the change logs and the corresponding priority value;
   generating, by the processor, a subset of software updates for display, the subset of software updates including software updates associated with the subset of matching metadata; and
   in response to receiving a selection input from a user, executing one or more software updates of the generated subset of software updates.

2. The method of claim 1, wherein determining an execution failure further comprises:
receiving a plurality of dump files; and
generating a second stack trace based on the received dump files,
determining an execution failure in the second stack trace.

3. The method of claim 1, wherein metadata includes at least one of a set of location data and a change log.

4. The method of claim 1, wherein determining a subset of matching metadata further comprises:
determining build information associated with the received stack trace.

5. The method of claim 1 wherein the calculated priority value is based on a position in stack value, a number of lines value, or a modification date, or a combination thereof.

6. The method of claim 1 further comprising:
at periodic intervals, determining that the generated subset of software updates includes software updates with a time stamp below a threshold; and executing the software updates with a time stamp below a threshold.

7. The method of claim 1, further comprising:
periodically monitoring for additional software updates in the plurality of software updates.

8. A computer program product for identifying software updates, the computer program product comprising:
one or more computer-readable storage media and program instructions stored on the one or more computer-readable storage media, the program instructions comprising:
instructions to receive a stack trace, the stack trace including a first set of metadata;
instructions to determine an execution failure in the received stack trace;
instructions to receive a plurality of software updates, the plurality of software updates including a second set of metadata associated with the execution failure;
instructions to determine a subset of matching metadata, the subset of matching metadata including metadata from at least one of the first set of metadata and the second set of metadata, wherein instructions to determine the subset of matching metadata comprises:
instructions to receive a plurality of change logs associated with the plurality of software updates;
instructions to generate a subset of the received plurality of change logs, the subset of change logs including change logs within a predetermined range, wherein the range includes at least a starting time stamp and an ending time stamp;
instructions to parse at least one of the change logs in the subset of change logs; and
instructions to calculate a priority value associated with at least one of the change logs of the subset of parsed change logs,
wherein the subset of matching metadata further comprises the at least one of the change logs and the corresponding priority value;
instructions to generate a subset of software updates for display, the subset of software updates including software updates associated with the subset of matching metadata; and
in response to receiving a selection input from a user, instructions to execute one or more software updates of the generated subset of software updates.

9. The computer program product of claim 8, wherein determining an execution failure further comprises:
instructions to receive a plurality of dump files;
instructions to generate a second stack trace based on the received dump files;
instructions to determine an execution failure in the second stack trace.

10. The computer program product of claim 8, wherein metadata includes at least one of a set of location data and a change log.

11. The computer program product of claim 8, wherein instructions to determine a subset of matching metadata further comprises:
instructions to determine build information associated with the received stack trace.

12. The computer program product of claim 8 wherein the calculated priority value is based on a position in stack value, a number of lines value, or a modification date, or a combination thereof.

13. The computer program product of claim 8 further comprising: at periodic intervals, instructions to determine that the generated subset of software updates includes software updates with a time stamp below a threshold; and instructions to execute the software updates with a time stamp below a threshold.

14. The computer program product of claim 8, further comprising: instructions to periodically monitor a database for additional software updates in the plurality of software updates.

15. A computer system for identifying software updates, the computer system comprising:
one or more computer processors;
one or more computer-readable storage media; and
program instructions stored on the computer-readable storage media for execution by at least one of the one or more processors, the program instructions comprising:
instructions to receive a stack trace, the stack trace including a first set of metadata;
instructions to determine an execution failure in the received stack trace;
instructions to receive a plurality of software updates, the plurality of software updates including a second set of metadata associated with the execution failure;
instructions to determine a subset of matching metadata, the subset of matching metadata including metadata from at least one of the first set of metadata and the second set of metadata, wherein instructions to determine the subset of matching metadata comprises:
instructions to receive a plurality of change logs associated with the plurality of software updates;
instructions to generate a subset of the received plurality of change logs, the subset of change logs including change logs within a predetermined range, wherein the range includes at least a starting time stamp and an ending time stamp;
instructions to parse at least one of the change logs in the subset of change logs; and
instructions to calculate a priority value associated with at least one of the change logs of the subset of parsed change logs,
wherein the subset of matching metadata further comprises the at least one of the change logs and the corresponding priority value;
instructions to generate a subset of software updates for display, the subset of software updates including software updates associated with the subset of matching metadata; and in response to receiving a selection input from a user, instructions to execute one or more software updates of the generated subset of software updates.

16. The computer system of claim 15, wherein determining an execution failure further comprises:
instructions to receive a plurality of dump files;
instructions to generate a second stack trace based on the received dump files; and
instructions to determine an execution failure in the second stack trace.

17. The computer system of claim 15, wherein metadata includes at least one of a set of location data and a change log.

18. The computer system of claim 15, wherein instructions to determine a subset of matching metadata further comprises:
instructions to determine build information associated with the received stack trace.

19. The computer system of claim 15 wherein the calculated priority value is based on a position in stack value, a number of lines value, or a modification date, or a combination thereof.

20. The computer system of claim 15 further comprising: at periodic intervals, instructions to determine that the generated subset of software updates includes software updates with a time stamp below a threshold; and instructions to execute the software updates with a time stamp below a threshold.

* * * * *